(12) United States Patent
Fujita

(10) Patent No.: US 6,516,134 B1
(45) Date of Patent: *Feb. 4, 2003

(54) DATA RECORDING/REPRODUCING METHOD AND APPARATUS

(75) Inventor: Hiroyuki Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/609,049

(22) Filed: Jun. 30, 2000

Related U.S. Application Data

(63) Continuation of application No. 08/826,099, filed on Mar. 24, 1997, now Pat. No. 6,130,985.

(30) Foreign Application Priority Data

Mar. 29, 1996 (JP) .............................................. 8-077993

(51) Int. Cl.[7] .................................................. H04N 5/91
(52) U.S. Cl. ............................ 386/95; 386/96; 386/125
(58) Field of Search ............................... 386/39, 45, 95, 386/98, 105–106, 125–126, 52; H04N 5/91

(56) References Cited

U.S. PATENT DOCUMENTS

| | | | |
|---|---|---|---|
| 4,641,203 A | 2/1987 | Miller | |
| 5,047,918 A | * 9/1991 | Schwartz et al. | ........... 703/203 |
| 5,107,343 A | 4/1992 | Kawai | |
| 5,351,132 A | 9/1994 | Sawabe et al. | |
| 5,410,676 A | 4/1995 | Huang et al. | |
| 5,454,096 A | 9/1995 | Otsuka et al. | |
| 5,623,587 A | 4/1997 | Bulman | |
| 5,774,657 A | 6/1998 | Okamura et al. | |
| 5,781,689 A | 7/1998 | Horii | |
| 5,802,245 A | 9/1998 | Kunihiro | |
| 6,130,985 A | * 10/2000 | Fujita | ........................ 386/95 |

* cited by examiner

Primary Examiner—Vincent Boccio
(74) Attorney, Agent, or Firm—Frommer Lawrence & Haug LLP; William S. Frommer

(57) ABSTRACT

A data recording/reproducing apparatus in which speech data and video data can be recorded or reproduced separately from each other, the number of channels of the speech data can be changed or in which plural speech data with different number of channels can co-exist. A random-accessible vide data storage device and a random-accessible speech data storage device are provided separately for separately recording or reproducing video data and speech data. A video data file and a speech data file, obtained on dividing the video data and the speech data into respective plural records and recording the resulting records by the above data storage devices, are managed by a CPU using a file entry stored in a RAM or a file management information storage unit, a video data record entry and a speech data record entry.

4 Claims, 15 Drawing Sheets

FIG.2(A)

FILE ENTRY

| FILE NAME |
|---|
| INITIAL RECORD ENTRY LINK |

FIG.2(B)

RECORD ENTRY

| NEXT RECORD ENTRY LINK |
|---|
| LEADING POSITION DATA |
| RECORDING LENGTH DATA |

FIG.2(C)

FREE SPACE LIST

| NEXT FREE SPACE LINK |
|---|
| LEADING POSITION DATA |
| RECORDING LENGTH DATA |

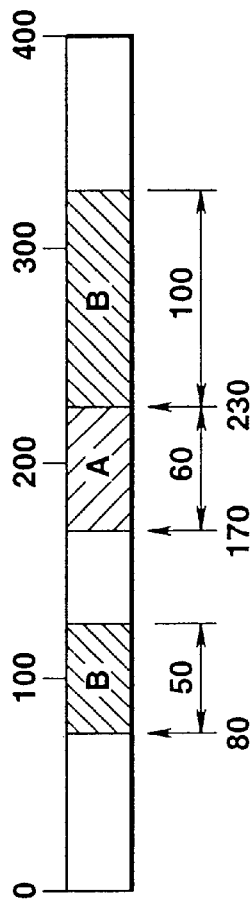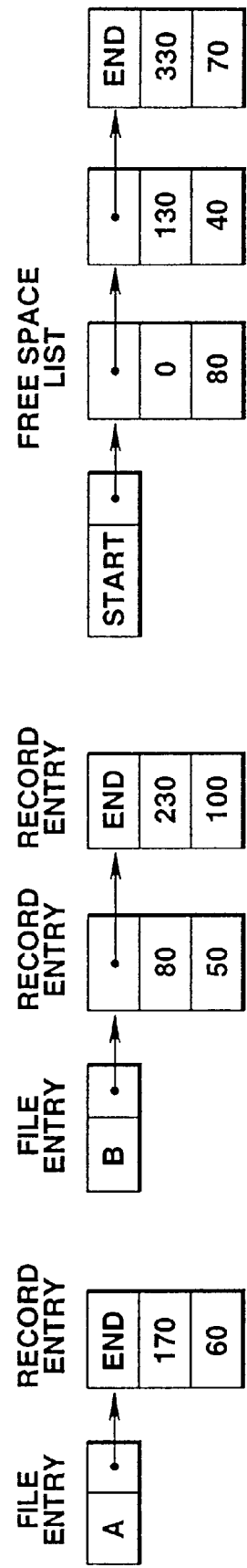

FIG.9(A)

FILE ENTRY

| FILE NAME |
|---|
| INITIAL VIDEO RECORD ENTRY LINK |
| INITIAL SPEECH RECORD ENTRY LINK |
| INITIAL SPEECH RECORD ENTRY LINK |
| INITIAL SPEECH RECORD ENTRY LINK |
| INITIAL SPEECH RECORD ENTRY LINK |

FIG.9(B)

VIDEO RECORD ENTRY

| NEXT VIDEO RECORD ENTRY LINK |
|---|
| LEADING POSITION DATA |
| RECORDING LENGTH DATA |

FIG.9(C)

SPEECH RECORD ENTRY

| NEXT SPEECH RECORD ENTRY LINK |
|---|
| LEADING POSITION DATA |
| RECORDING LENGTH DATA |

FIG.9(D)

FREE SPACE LIST FOR VIDEO

| NEXT VIDEO FREE SPACE LINK |
|---|
| LEADING POSITION DATA |
| RECORDING LENGTH DATA |

FIG.9(E)

FREE SPACE LIST FOR SPEECH

| NEXT VIDEO FREE SPACE LINK |
|---|
| LEADING POSITION DATA |
| RECORDING LENGTH DATA |

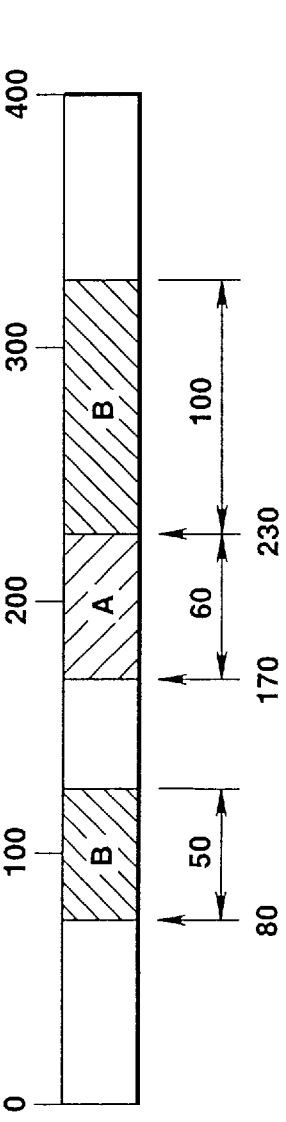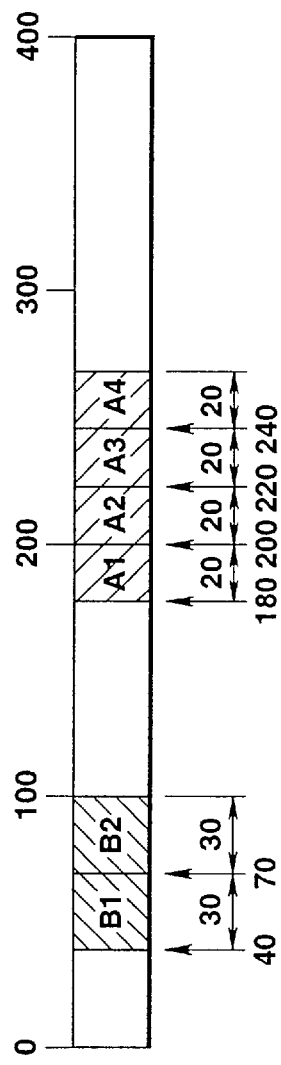
FIG.10(A) LOGIC ADDRESS OF VIDEO DATA RECORDING MEDIUM
FIG.10(B) LOGIC ADDRESS OF SPEECH DATA RECORDING MEDIUM

DATA RECORDING/REPRODUCING METHOD AND APPARATUS

This application is a continuation of Ser. No. 08/826,099 filed Mar. 24, 1997 now U.S. Pat. No. 6,130,985.

BACKGROUND OF THE INVENTION

This invention relates to a data recording/reproducing method and apparatus for recording speech or video data on a recording medium, to which random access can be had, such as a hard disc, and for reproducing the recorded data.

Recently, a random-accessible hard disc array device, composed of a large number of large-capacity hard disc devices and having a recording capacity of tens to hundreds of gigabytes (GB), has been put to practical use.

This hard disc array device is suited for recording speech data and/or video data of an extremely large data volume. In particular, the hard disc array device is superior as a recording/reproducing apparatus for an editing device because of its characteristics of reproducing given speech/video data in a short access time.

Meanwhile, the video data and the speech data are collectively recorded on the recording medium. If data is managed on the file basis, the video data and the speech data are handled as a set, so that the video data and the speech data cannot be handled separately from each other without difficulties.

The result is such defects that the number of channels of the speech data cannot be modified on the file basis partway, that the files of speech data with different number of channels cannot be made to co-exist and hence the number of speech channels has to be matched to the maximum number thus producing loss in the recording medium, that a recording area for images and the maximum number of the speech channels has to be used for data composed only of speech or data composed only of images, thus wasting the recording medium, and that the image only or optional speech channels only cannot be changed.

SUMMARY OF THE INVENTION

It is therefore an object of the present invention to provide a recording/reproducing method and apparatus for speech and/or video data whereby, in recording speech/video data, as plural editing objects, on a random-accessible recording medium, such as a hard disc or a magneto-optical disc (MO disc), and in reproducing optional speech/video data responsive to request from an external device, such as editing device, the video data and the speech data can be handled as independent files.

In one aspect, the present invention provides a data recording/reproducing apparatus including first data recording/reproducing means for recording a video data file on a random-accessible recording medium as one or more records each of which is a set of data continuous on the recording medium and for reproducing the recorded video data file, second data recording/reproducing means for recording a speech data file on the random-accessible recording medium as one or more records each of which is a set of data continuous on the recording medium and for reproducing the recorded speech data file, and data management means for managing the video data file and the speech data file, each recorded as one or more records on the recording medium, by a file entry, a video data record entry and a speech data record entry. The file entry has a file name of the video data file, a file name of the speech data file, a record entry number of a leading record of the video data and a record entry number of a leading record of the speech data file. The video data record entry is provided in association with each record of the video data file and has leading position data specifying the leading end of a recording area of the next record with data continuity and recording length data specifying the size of the recording area of the next record. The speech data record entry is provided in association with each record of the speech data file and has leading position data specifying the leading end of a recording area of the next record with data continuity and recording length data specifying the size of the recording area of the next record. The data recording/reproducing apparatus also includes means for managing a vacant area of video data present in a dispersed state on the recording medium by a video data vacant area list having a link data specifying the link state to the next vacant area, leading position data specifying the leading position of the vacant area and an areal length data specifying the size of the vacant area and means for managing a vacant area of speech data present in a dispersed state on the recording medium by a speech data vacant area list having a link data specifying the link state to the next vacant area, leading position data specifying the leading position of the vacant area and an areal length data specifying the size of the vacant area.

In another aspect, the present invention also includes a data recording/reproducing method including recording a video data file on a random-accessible recording medium as one or more records each of which is a set of data continuous on the recording medium and for reproducing the recorded video data file, recording a speech data file on the random-accessible recording medium as one or more records each of which is a set of data continuous on the recording medium and for reproducing the recorded speech data file, and managing the video data file and the speech data file, each recorded as one or more records on the recording medium, by a file entry, a video data record entry and a speech data record entry. The file entry having a file name of the video data file, a file name of the speech data file, a record entry number of a leading record of the video data and a record entry number of a leading record of the speech data file, while the video data record entry is provided in association with each record of the video data file and has leading position data specifying the leading end of a recording area of the next record with data continuity and recording length data specifying the size of the recording area of the next record, the speech data record entry provided in association with each record of the speech data file and having leading position data specifying the leading end of a recording area of the next record with data continuity and recording length data specifying the size of the recording area of the next record.

Preferably, the data recording/reproducing method additionally includes managing a vacant area of video data present in a dispersed state on the recording medium by a video data vacant area list having a link data specifying the link state to the next vacant area, leading position data specifying the leading position of the vacant area and an areal length data specifying the size of the vacant area, and managing a vacant area of speech data present in a dispersed state on the recording medium by a speech data vacant area list having a link data specifying the link state to the next vacant area, leading position data specifying the leading position of the vacant area and an areal length data specifying the size of the vacant area.

With the data recording and/or reproducing method and apparatus according to the present invention, in which and random-accessible video data recording and/or reproducing means and random-accessible speech data recording and/or reproducing means are provided separately from each other, and a video speech file and a speech data file, each recorded as one or more record by these data recording and/or reproducing means, is managed by data management means using a file entry, a video data record entry and a speech data record entry, the number of channels of the speech data can be changed at any time, while the speech data with different number of channels can be made to co-exist. Thus it becomes possible to handle data composed only of speech or video, or to change only the video or only an optional channel of the speech.

BRIEF DESCRIPTION OF THE DRAWINGS

FIG. 2 illustrates an example of a file management information used for file management in the data recording/reproducing apparatus shown in FIG. 1.

FIG. 3 illustrates a recording example of the video/speech data in the data recording/reproducing apparatus shown in FIG. 1 and specified example of the file management information used for file management.

FIG. 9 illustrates an example of the file management information used for file management in the data recording/reproducing apparatus shown in FIG. 1.

FIG. 10 illustrates a recording example of video/speech data in the data recording/reproducing apparatus embodying the present invention.

DESCRIPTION OF THE PREFERRED EMBODIMENTS

The data recording/reproducing method and apparatus according to the present invention provides separate random-accessible recording/reproducing means for video and speech for recording/reproducing video and speech data. The data files, recorded as one or more records by these recording/reproducing means, are managed by the data management means using the file entry, video entry and speech data record entry.

Before proceeding to description of preferred embodiments of the present invention, an illustrative data recording/reproducing apparatus for recording/reproducing video and speech data in a lump is now explained, as a data recording/reproducing apparatus used for illustrating the present invention.

Figure 1:
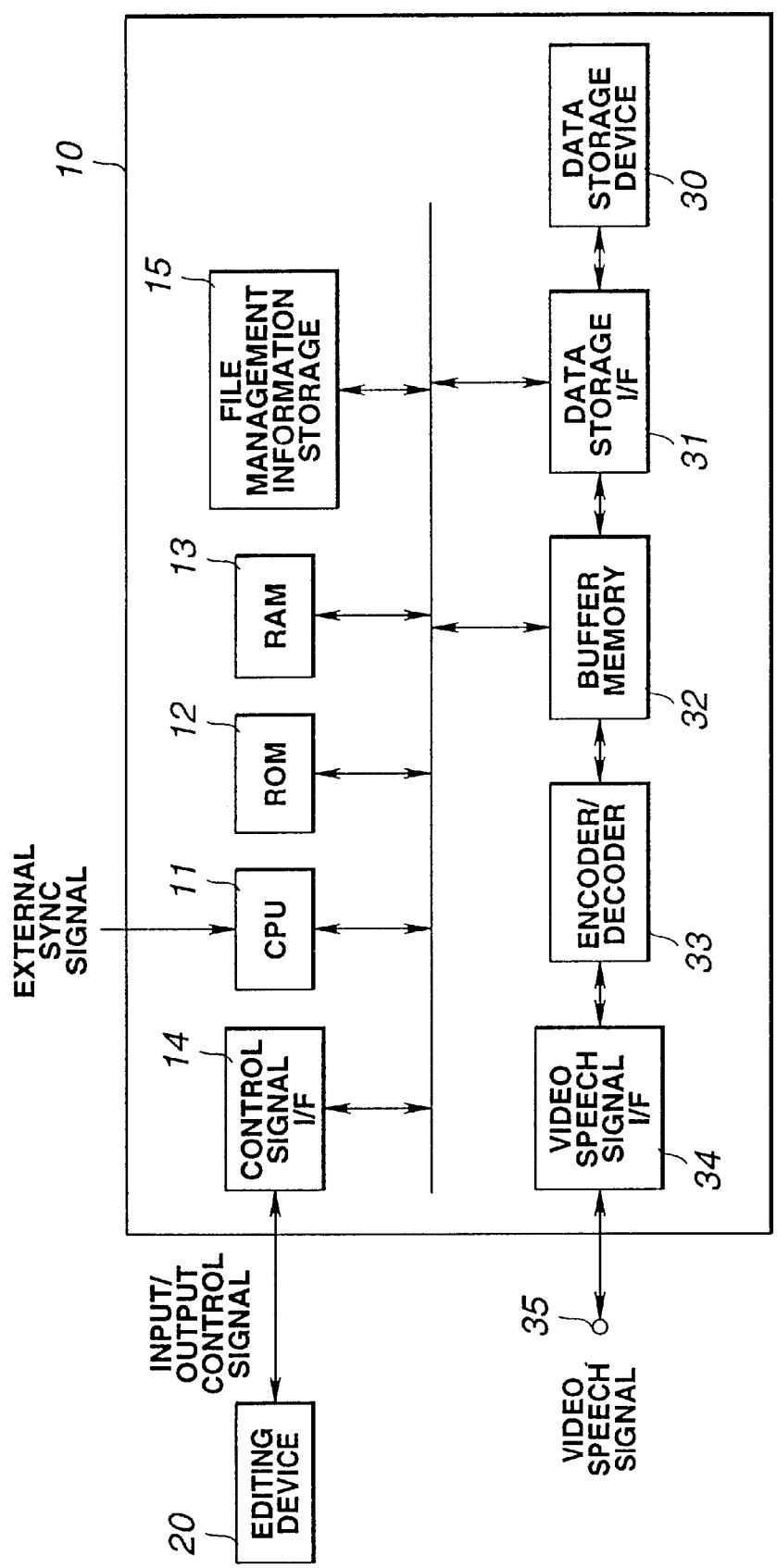
FIG. 1 is a block diagram showing the structure of a data recording/reproducing apparatus for illustrating the present invention.

FIG. 1 is a block diagram showing a system configuration of a data recording/reproducing apparatus 10 used for illustrating the present invention.

Referring to FIG. 1, an editing device 20 is connected to the data recording/reproducing apparatus 10 and generates input/output control signals for controlling the data recording/reproducing apparatus 10. The data recording/reproducing apparatus 10 records plural speech data and/or plural video data (speech/video data) and is responsive to the request from the editing device 20 to supply the speech/video data as objects of editing to the editing device 20. Moreover, the data recording/reproducing apparatus 10 receives, from the editing device 20, data specifying which portion of the data material is used in the speech/video data (editing result data) obtained as the result of editing, and reproduces the speech/video data of the same contents as the editing result data based on the editing data.

Referring to the internal structure of the data recording/reproducing apparatus 10, a CPU (micro-processor unit) 11, a read-only memory (RAM) 12, having a CPU program stored therein, a random access memory (RAM) 13, as a working area for executing the program, a control signal interfacing circuit (control signal I/F circuit) 14 for capturing input/output signals from the editing device 20 for transmitting the signal to the CPU and a file management information storage unit 15, such as a hard disc, for storing the file management information as later explained, are connected to a bus line 16. These constituent portions make up a control computer. The various constituent portions of the data recording/reproducing apparatus 10 are controlled by the editing data entered from the editing device 20 for managing respective recording areas of the speech/video data recorded in a data storage device 30. Specifically, the CPU (micro-processor unit) 11 is made up of a general-purpose micro-processor or a reduced instruction set computer (RISC) and a peripheral circuit. The CPU 11 executes the program stored in the ROM 12, using the RAM 13, and transmits or receives editing data and reply data with the editing device 20 via the control signal I/F circuit 14.

The data storage device 30 is large-capacity random-accessible data recording/reproducing means, such as a hard disc array device, and executes data input/output with an interfacing circuit (data storage I/F circuit) 31, such as SCSI, connected to the bus line 16. The data storage I/F circuit 31 executes data input/output with a buffer memory 32 connected to the bus line 32. The buffer memory 32 executes data input/output with an encoder/decoder 33 and performs data buffering between video/speech signals as continuous data at a pre-set rate and data of the data storage device 30 as high-speed intermittent data. The encoder/decoder 33 performs data compression/expansion, if need be, while performing input/output of the speech/video signals with an external terminal 35 via a speech/video signal interfacing circuit (speech video signal I/F circuit) 34.

The CPU 11 of the data recording/reproducing apparatus controls the data storage device 30 and so forth via data storage I/F circuit 31 in timed relation to synchronization signals, such as reference signals of a broadcasting station, and causes speech/video data to be recorded on the data storage device 30 responsive to requests from an external equipment, such as an editing device 20, while furnishing the recorded speech/video data to an external equipment, such as editing device 20. The CPU 11 also generates recording area data or the file management information specifying a recording area of the recording medium, such as hard disc, of the data storage device 30, occupied by the speech/video data recorded on the data storage device 30. The CPU 11 also generates recording area data or the file management information for partial data specifying the recording area of the recording medium of the data storage device 30 occupied by the partial data. The partial data is the portion of speech/video data (data material) contained in the editing result data. In addition, the CPU 11 causes the generated recording area data or file management information to be stored in the RAM 13 for storage in the file management information storage unit 15, such as hard disc.

Next, a specified example of recording data management by the data storage device 30 employing the file management information or the recording area data is explained.

FIG. 2 shows an example of the file management information or the recording area data. The file management information is writing/readout controlled to or from the RAM 13 or the file management information storage unit 15 by the CPU 11. This file management information is formulated as a list of a so-called linked list (record entry).

In the file management information, shown in FIG. 2, (A) denotes æfile entryÆ made up of a æfile nameÆ specifying a file name and an æinitial record entry linkÆ specifying the record entry number associated with the data of the file to be recorded/reproduced. The record means a set of data continuously recorded on a recording medium of the data storage device 30. FIG. 2(B) shows ærecord entryÆ made up of ænext record entry linkÆ specifying the record entry number corresponding to the data in the file to be recorded/reproduced next, æleading position dataÆ specifying the leading address of the data continuously recorded on the medium of the data storage device 30, that is the record, and ærecording length dataÆ specifying the data size of the record. If link data of the ænext record entry linkÆ is an end value (END), there is no next record entry, with the last portion of the speech/video data being recorded in the recording area specified by the record entry. FIG. 2(C) specifies æfree space listÆ for specifying a vacant area on the medium of the data storage device 30. The æfree space listÆ is made up of ænext free space linkÆ specifying the free space number corresponding to the next vacant area, æleading position dataÆ specifying the leading address of the free space and ærecording length dataÆ specifying the size of the free space. The size of the address for the leading position data or the recording length data may be represented with a block, for example, as a unit. The block size may, for example, be a size corresponding to a sector, such as 512 bytes, of a hard disc device (HDD) multiplied by the number of the HDDs used as so-called RAID, for example, 4 kB (kilobytes).

FIG. 3 shows a recording example of the speech/video data when employing such file management information. Specifically, FIG. 3 shows a typical example of the recording area of the recording medium of the data storage device 30 of FIG. 1 occupied by, for example, two speech/video data A, B, and the file management information.

FIG. 3(A) shows a typical example of the recording data on the recording medium of the data storage device 30, herein speech/video data of two files A and B. The speech/video data A is recorded in the 170th to 229th blocks, as counted from the leading end of the recording medium, with one block being, for example, 4 kB. The speech/video data B is recorded in the 80th to 129th blocks and from 230th to 329th blocks, as counted from the leading end of the recording medium, with the remaining recording area being a vacant recording area.

Since a sole speech/video data is sometimes divisionally recorded in plural recording areas, the CPU 11 formulates the file management information of each of the speech/video data A and B as lists of the linked list form (record entry) shown in FIGS. 3(A), (B) and (C). The CPU 11 generates the vacant recording area data specifying the vacant recording area (free space) of the data storage device 30 as the list of the linked list form (free space list) as shown in FIG. 3(D).

The operation of the above-described data recording/reproducing apparatus is now explained mainly with respect to the processing for generating the record entry and the playback entry.

First, the operation of the data recording/reproducing apparatus 10 recording the speech/video signals entered from outside on the data storage device 30 is explained with reference to recording the speech/video data A shown n FIG. 3(A) taken as an example.

Figure 4:
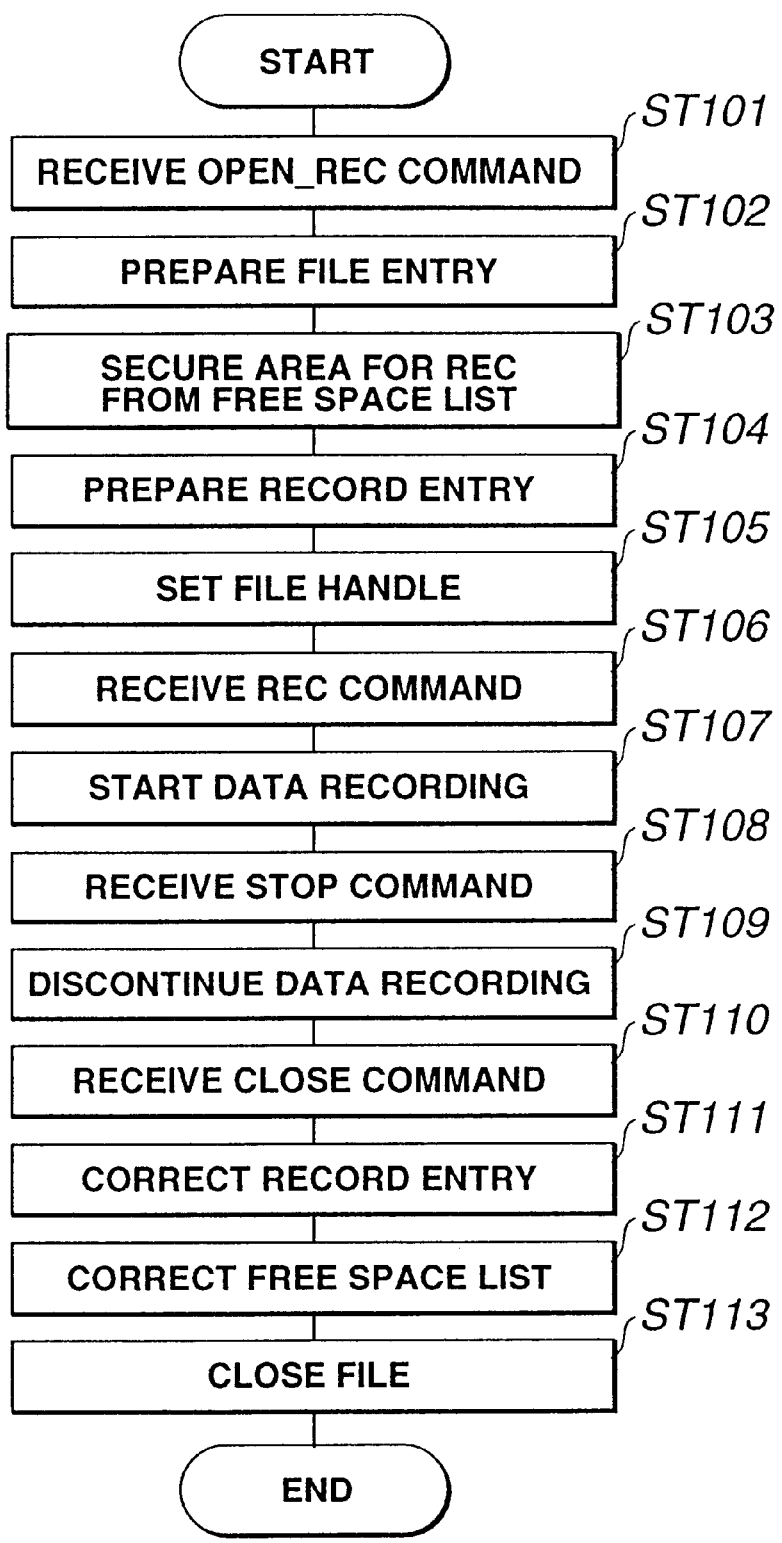
FIG. 4 is a flowchart for illustrating the processing for recording video/speech data entered from outside by the data recording/reproducing apparatus shown in FIG. 1.
Figure 5:
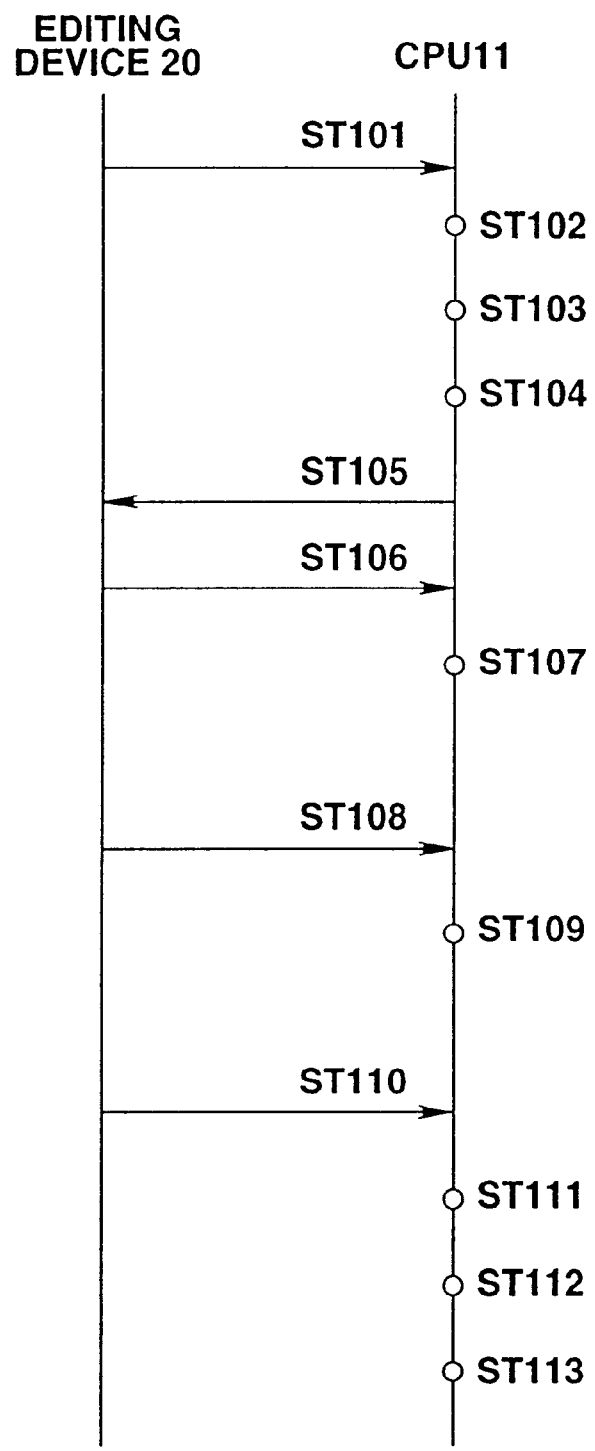
FIG. 5 illustrates the sequence of transmission/reception of control signals between the data recording/reproducing apparatus shown in FIG. 1 and an external editing device when recording video/speech data entered from outside.

FIG. 4 shows, in a flowchart, the processing by the CPU 11 of the recording/reproducing apparatus 10 when recording the speech/video data supplied from outside on the data storage device 30, while FIG. 5 shows, in a sequence chart, the control signals between the editing device 20 and the data recording/reproducing apparatus 10 when recording the speech/video data entered from outside on the data storage device 30.

Referring to FIGS. 4 and 5, the editing device 20 outputs to the CPU 11 of the recording/reproducing apparatus 10 at step ST101 a command (OPEN_REC command) for formulating record entry of the speech/video data including pre-set data such as the file name (A) and data length (60 blocks). The CPU 11 of the recording/reproducing apparatus 10 receives this OPEN_REC command.

At step ST1102, the CPU 11 of the recording/reproducing apparatus 10 generates the file entry (FIGS. 2A and 3B) for storage in the RAM 13 and in the file management information storage unit 15.

At step ST103, the CPU 11 of the recording/reproducing apparatus 10 analyzes the free space list stored in the RAM 13 or in the file management information storage unit 15 and secures an area for recording.

At step ST104, the CPU 11 of the data recording/reproducing apparatus 10 generates the record entry (FIGS. 2B and 3B), based on the data, such as file name included in the OPEN_REC command, for recording in the RAM 13 or in the file management information storage unit 15.

At step ST105, the CPU 11 of the recording/reproducing apparatus 10 sets a fie handle (FIG. 2A) for the editing device 20 to have access to the opened file, and sends the file handle thus set tp the editing device 20.

At step ST106, the editing device 20 outputs a command (REC command) for the data recording/reproducing apparatus 10 to start the recording of the speech/video data A. The CPU 11 of the data recording/reproducing apparatus 10 receives this REC command.

At step ST107, the CPU 11 of the data recording/ reproducing apparatus 10, receiving the REC command, causes the speech/video data entered from the external equipment to be recorded in the data storage device 30 in the sequence in which the data is recorded in the record entry.

At step ST108, the editing device 20 outputs to the data recording/reproducing apparatus 10 a command (STOP command) for terminating the recording of the speech/video data A. The data recording/reproducing apparatus 10 receives this STOP command.

At step ST109, the CPU 11 of the data recording/ reproducing apparatus 10, receiving the STOP command, discontinues the recording of the speech/video data A by the data storage device 30.

At step ST110, the editing device 20 outputs to the data recording/reproducing apparatus 10 a command (CLOSE command) for correcting (updating) the record entry and the free space list. The CPU 11 of the data recording/ reproducing apparatus 10 receives this CLOSE command.

At step ST111, the size of the recorded data is recorded in an item of the recording length data of the record entry and the file is closed.

At step ST112, the area secured for recording without being used is opened and added to the free space list.

At step ST113, the recording file is closed.

The operation of the data recording/reproducing apparatus reproducing and outputting the speech/video signal recorded in the data storage device 30 is explained.

Figure 6:
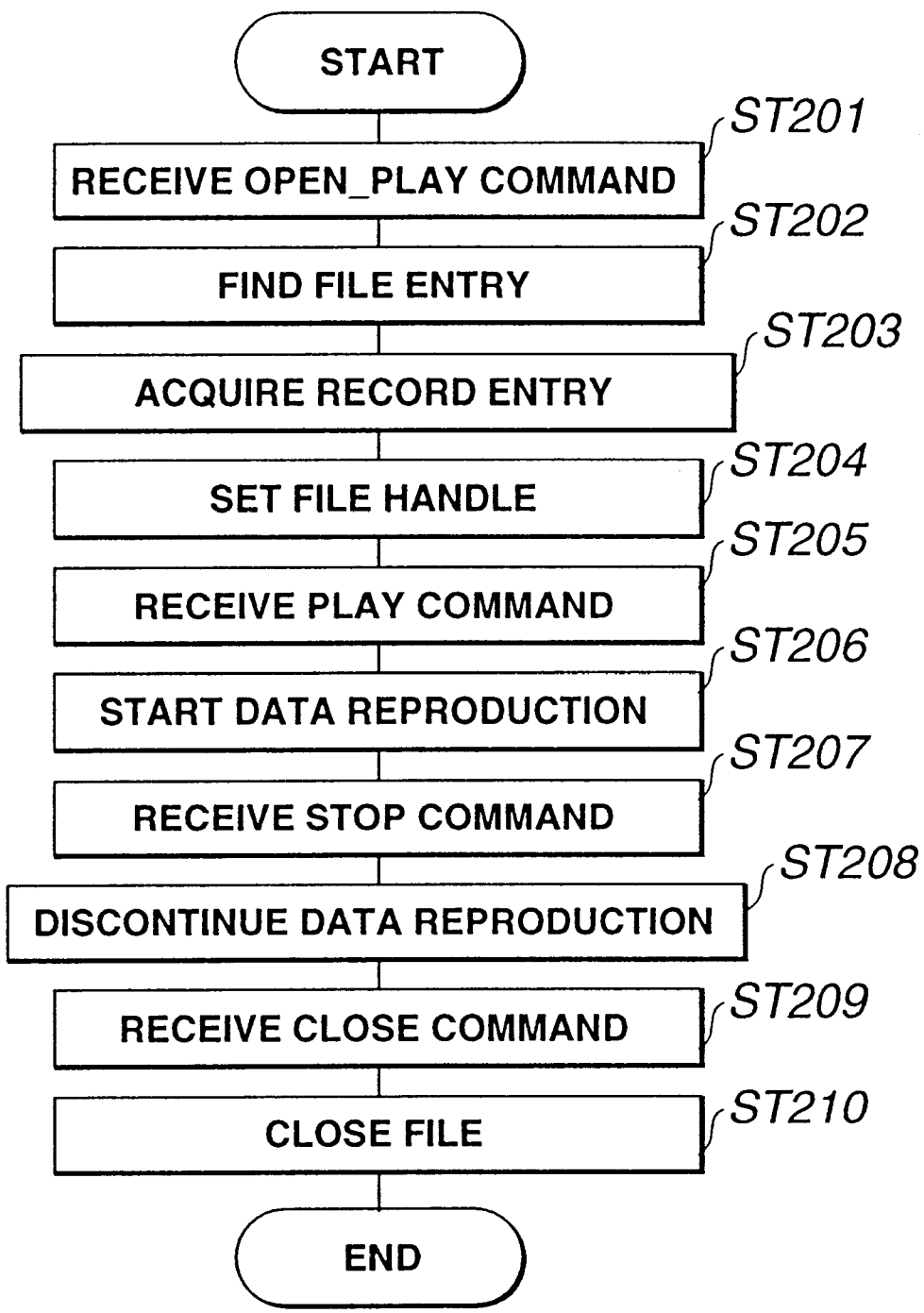
FIG. 6 is a flowchart for illustrating the processing for reproducing the video/speech data recorded by the data recording/reproducing apparatus shown in FIG. 1.
Figure 7:
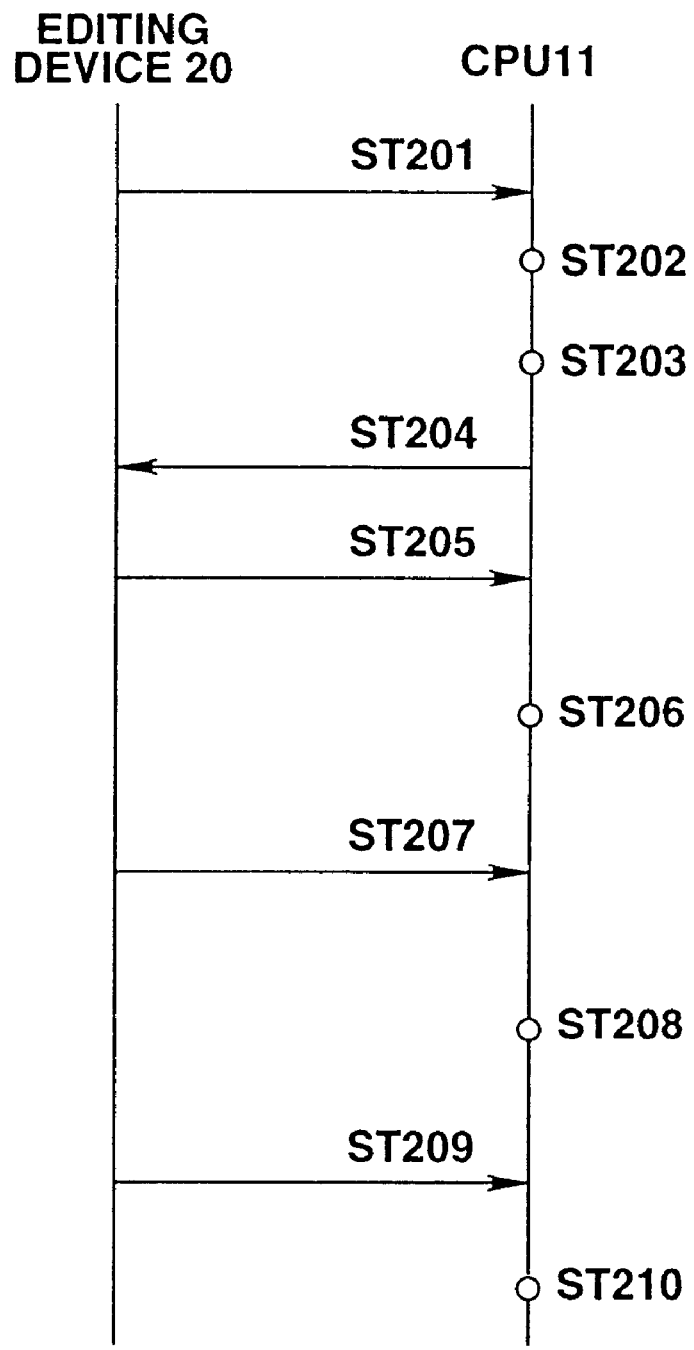
FIG. 7 illustrates the sequence of transmission/reception of control signals between the data recording/reproducing apparatus shown in FIG. 1 and the external editing device when reproducing the video/speech data in the data recording/reproducing apparatus shown in FIG. 1.

FIG. 6 shows, in a flowchart, the processing by the CPU 11 of the data recording/reproducing apparatus 10 of reproducing the speech/video data. FIG. 7 shows, in a sequence chart, the control signals between the editing device 20 and the CPU 11 of the data recording/reproducing apparatus 10 when the data recording/reproducing apparatus 10 shown in FIG. 1 reproduces the speech/video data recorded in the data storage device 30.

At step ST201, the editing device 20 outputs to the data recording/reproducing apparatus 10 a command (OPEN-PLAY command) to make ready for reproduction of the speech/video data including data of the file name (A). The CPU 11 of the data recording/reproducing apparatus 10 receives this OPEN-PLAY command.

At step ST202, the CPU 11 of the data recording/ reproducing apparatus 10 retrieves the file name of the optional data of the OPEN-PLAY command from the file name item of the file entry stored in the RAM 13 or in the file management information storage unit 15 and, based on the result of retrieval, acquires the record entry of the speech/video data A.

At step ST203, the contents of the record entry are sequentially acquired from the item of the first record entry of the retrieved file entry.

At step ST204, the data recording/reproducing apparatus 10 sets a file handle for the editing device 20 to access the opened file and sends the set file handle to the editing device 20.

At step ST205, the editing device 20 outputs to the data recording/reproducing apparatus 10 a command (PLAY command) of starting the reproduction of the speech/video data A. The CPU 11 of the data recording/reproducing apparatus 10 receives this PLAY command.

At step ST206, the CPU 11 of the data recording/ reproducing apparatus 10 takes out the speech/video data A recorded in the data storage device 30 from the area stated in the record entry and sequentially reproduces the data A to output the reproduced data to the editing device 20.

At step ST207, the editing device 20 outputs to the data recording/reproducing apparatus 10 a command (STOP command) of discontinuing the reproduction of the speech/ video data A. The data recording/reproducing apparatus 10 receives this STOP command.

At step ST208, the data recording/reproducing apparatus 10 controls the data storage device 30 to discontinue reproduction of the speech/video data A.

At step ST209, the editing device 20 outputs to the data recording/reproducing apparatus 10 a command (CLOSE command) of closing the playback file. The data recording/ reproducing apparatus 10 receives this CLOSE command.

AtstepST210, the editing device 20 closes the file of the speech/video data so far reproduced.

Referring to the drawings, a preferred embodiment of the data recording and/or reproducing apparatus according to the present invention s explained in detail.

Figure 8:
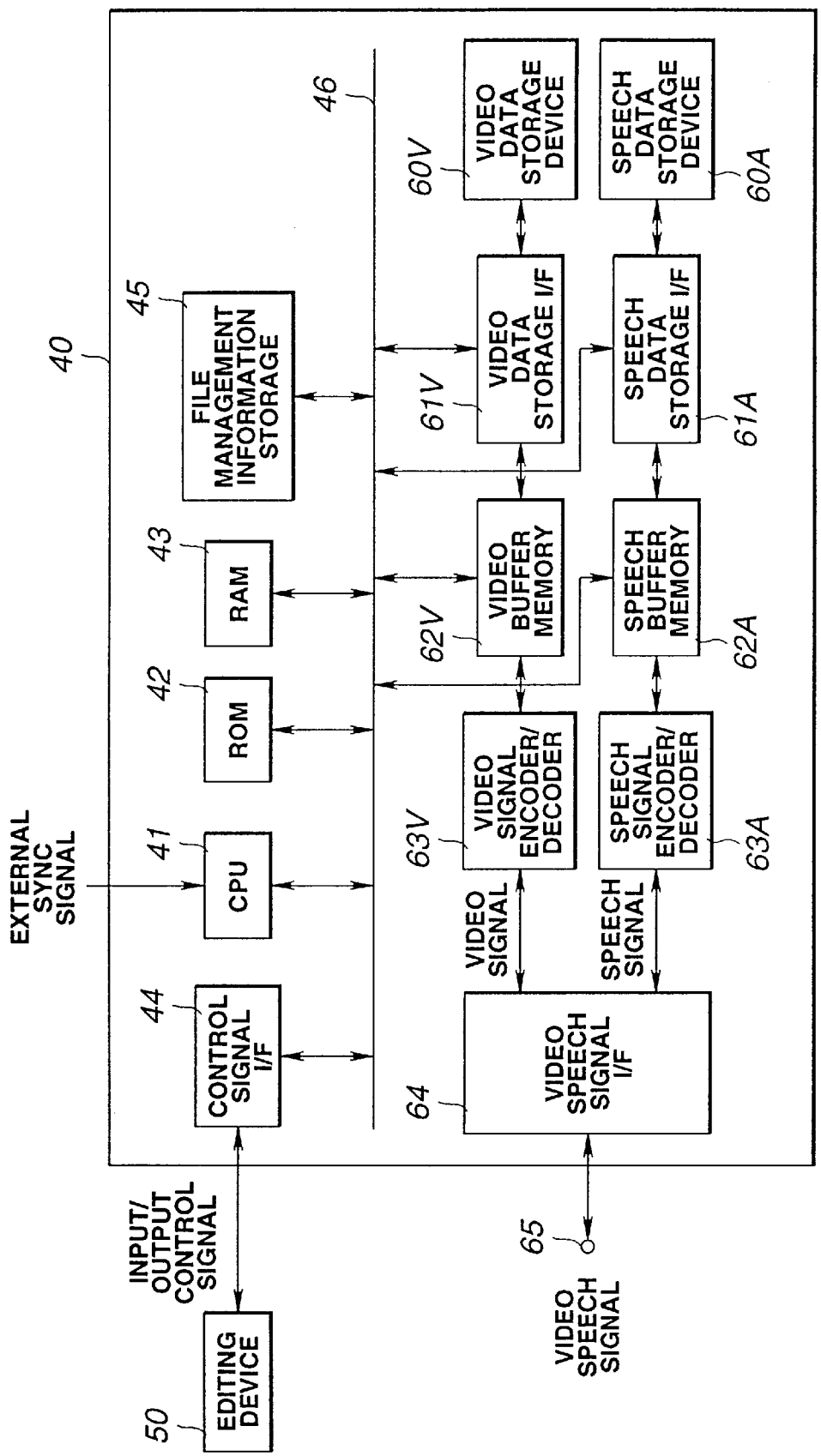
FIG. 8 is a block diagram showing an example of a system configuration of the data recording/reproducing apparatus embodying the present invention.

FIG. 8 shows, in a block diagram, a system configuration of a recording/reproducing apparatus 40 for speech and video data embodying the present invention.

In the example of FIG. 8, a data recording/reproducing apparatus 40 includes a video data storage device 60V for dividing a video data file into plural records for recording on a random-accessible recording medium and for reproducing the recorded data file, and a speech data recording/ reproducing device 60A for dividing an audio data file into plural records for recording on a random-accessible recording medium and for reproducing the recorded data file.

In FIG. 8, an editing device 50 is connected to the data recording/reproducing apparatus 40 for generating an input/ output control signal for controlling the data recording/ reproducing apparatus 40. The data recording/reproducing apparatus 40 records plural speech data and/or plural video data (speech/video data) and furnishes the speech/video data, as object of editing, to the editing device 50 responsive to a demand from the editing device 50. In addition, the data recording/reproducing apparatus 40 receives, from the editing device 50, data (editing data) specifying which portion of the data material is being used in the speech/video data (editing result data) obtained as the result of the editing and, based on the editing data, reproduces the speech/video data of the same contents as the editing result data.

Referring to the internal structure of the data recording/ reproducing apparatus 40, a CPU (micro-processor unit) 41, a read-only memory (RAM) 42, having a CPU program stored therein, a random access memory (RAM) 43, as a working area for executing the program, a control signal interfacing circuit (control signal I/F circuit) 44 for capturing input/output signals from the editing device 50 for transmitting the signal to the CPU, and a file management information storage unit 45, such as a hard disc, for storing the file management information as later explained, are connected to a bus line 46. These constituent portions make up a control computer. The various constituent portions of the data recording/reproducing apparatus 40 are controlled by the editing data entered from the editing device 50 for managing recording areas of the video data recorded in the data storage device 60V and those of the speech data recorded in the data storage device 60A. Specifically, the CPU (micro-processor unit) 41 is made up of a general-purpose micro-processor or a reduced instruction set computer (RISC) and a peripheral circuit. The CPU 41 executes the program stored in the ROM 42, using the RAM 43, and transmits or receives editing data and reply data with the editing device 50 via the control signal I/F circuit 44.

The video data storage device 60V and the speech data storage device 60A are large-capacity random-accessible data recording/reproducing means, such as hard disc array devices. The video data storage device 60V stores and outputs video data with an interfacing circuit (video data storage I/F circuit) 61V, such as SCSI, connected to the bus line 46. The speech data storage device 60A receives or outputs data from or to an interfacing circuit (speech data storage I/F circuit) connected to the bus line 46. The video data storage I/F circuit 61V and the speech data storage I/F circuit 61A receive and output data from or to a video buffer memory 62V and an audio buffer memory 62A connected to the bus line 46. The video buffer memory 62V receives and outputs data from or to a video signal encoder/decoder 63V, while the audio buffer memory 62A receives and outputs data from or to a speech signal encoder/decoder 63A. The video buffer memory 62V and the audio buffer memory 62A perform data buffering between the video and audio signals which are continuous data at a pre-set speed and the video data and audio data of the video data storage device 60V and the audio data storage means 60A which are high-speed intermittent data. The video signal encoder/decoder 63V and the speech signal encoder/decoder 63A perform data compression/expansion, if need be, to receive or output speech and video data at an external terminal 65 via an interfacing circuit for speech and video signals (speech video signal I/F circuit) 64.

The CPU 41 of the data recording/reproducing apparatus 40 operates in synchronism with synchronization signals, such as reference signals of a broadcasting station, for controlling the video data storage device 60V and the audio data storage means 60A via video and audio data storage I/F circuits 61V and 61A for recording video data and speech data in the video data storage device 60V and the audio data storage means 60A, respectively, responsive to requests from an external equipment, such as the editing device 50, and for furnishing the recorded speech/video data to the externals equipments, such as the editing device 50. The CPU 41 generates recording area data or file management information specifying a recording area of the recording medium (e.g., hard disc) of each of the data storage devices 60V and 60A occupied by the speech data and the video data recorded in the video data storage device 60V and the audio data storage means 60A, respectively. The CPU 41 generates the recording area data or the file management information for partial data (portions of the speech/video data (data material) included in the editing result data) specifying the recording area of the recording medium of each of the data storage devices 60V and 60A occupied by the partial data. In addition, the CPU 41 stores the generated recording area data or the file management information in the RAM 43 for storage in the file management information storage unit 45.

An illustrative example of managing the recording data of the data storage devices 60V and 60A for video and speech employing the file management information or the recording area data is now explained.

FIG. 9 shows an example of the file management information or the recording area data. The file management information is write/readout controlled by the CPU 41 with respect to the RAM 43 or the file management information storage unit 45. The file management information is formulated as the list of the so-called linked list (record entry).

In the file management information, shown in FIG. 9, (A) denotes a æfile entryÆ having a æfile nameÆ specifying the file name and æinitial record entry linkÆ specifying the record entry number associated with data of the file to be initially recorded or reproduced. The record herein means a set of data continuously recorded on the recording medium of each of the data storage devices 60V and 60A. The vide record for the video data is managed independently of the audio record for the audio data. In the example of FIG. 9A, the file entry has an æinitial video record entry linkÆ specifying the video data to be initially recorded/reproduced and four æinitial speech record entry linksÆ specifying the first speech record entry numbers of, for example, four channels of the audio or speech data. FIG. 9B shows ævideo record entryÆ including ænext video record entry linkÆ specifying the video record entry number associated with the video data in the file to be recorded/reproduced next, æleading position dataÆ specifying the leading address of video data continuously recorded on the recording medium of the video data storage device 60V, that is video record, and ærecording length dataÆ specifying the size of the video data of the video record. FIG. 9C shows æspeech record entryÆ made up of ænext speech record entry linkÆ specifying the speech record entry number associated with the speech data in the file to be recorded/reproduced next, æleading position dataÆ specifying the leading address of the speech data continuously recorded on the recording medium of the audio data storage device 60A, that is audio record, and ærecording length dataÆ specifying the size of the free space for video. FIG. 9D shows æfree space list for videoÆ for specifying the vacant area on the recording medium of the video data storage device 60V and is made up of æfree space list for next videoÆ specifying the free space number for video associated with the next vacant area, æleading position dataÆ specifying the leading address of the free space for video and ærecording length dataÆ specifying the size of the free space for video. FIG. 9E shows the æfree space list for speechÆ for specifying the vacant area on the recording medium of the speech data storage device 60A and is made up of æfree space list for next speechÆ specifying the free space number for speech associated with the next vacant area, æleading position dataÆ specifying the leading address of the free space for speech and ærecording length dataÆ specifying the size of the free space for speech. The address of the leading position data or the size of the recording length data may, for example, be represented in terms of a block as unit.

Figure 11B:
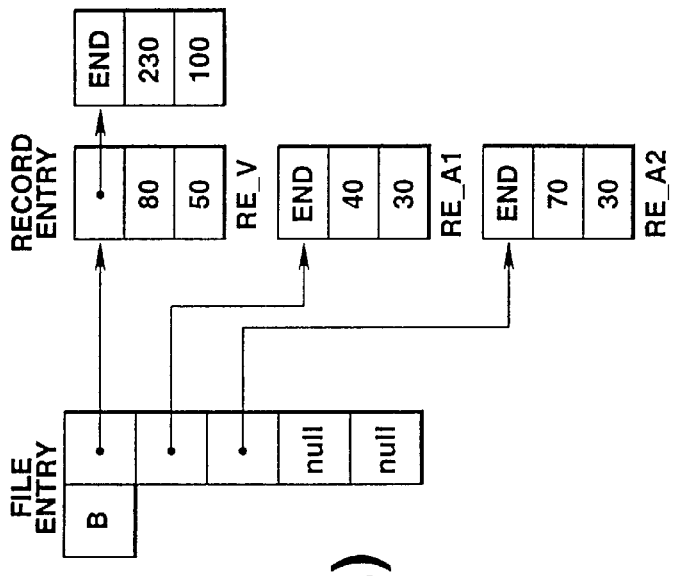
FIG. 11 illustrates a specified example of the file management information used for file management of video/speech data in the data recording/reproducing apparatus embodying the present invention.

FIGS. 10 and 11 show a recording example of the speech/video data when employing such file management information. Specifically, FIGS. 10 and 11 show a typical example of the recording area of the recording medium of the data storage devices 60V and 60A of FIG. 8 occupied by, for example, two speech/video data A, B, and the file management information.

FIG. 10(A) shows a typical example of the recording data on the recording medium of the video data storage device 60V, herein video data of two files A and B. The video data of the file A is recorded in the 170th to 229th blocks, as counted from the leading end of the recording medium, with one block being, for example, 4 kB, while the video data of the file B is recorded in the 80th to 129th blocks and from 230th to 329th blocks, as counted from the leading end of the recording medium, with the remaining recording area being a vacant recording area.

FIG. 10(B) shows a typical example of the recording data on the recording medium of the speech data storage device 60A, herein speech data of two files A and B. There are four channels of the speech data of the file A. If these speech data are denoted A1 through to A4, the speech data A1 is recorded in the 180th to 199th blocks, the speech data A2 is recorded in the 200th to 219th blocks, the speech data A3 is recorded in the 220th to 239th blocks and the speech data A4 is recorded in the 240th to 259th blocks, as counted from the leading end of the recording medium. There are two channels of the speech data of the file B. If these speech data are denoted B1 and B2, the speech data B1 is recorded in the 40th to 69th blocks and the speech data B2 is recorded in the 70th to 99th blocks, as counted from the leading end of the recording medium. The remaining recording area is the vacant recording area.

Figure 11C:
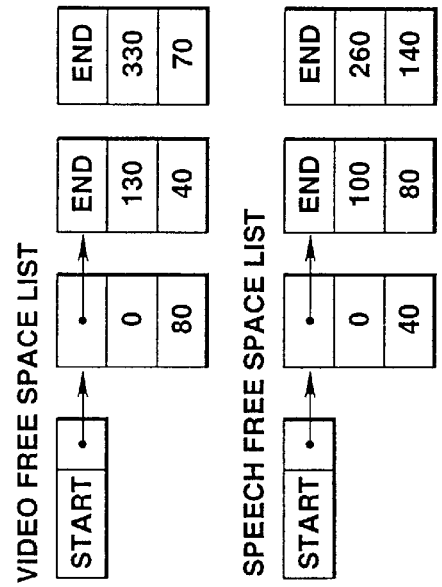
Figure 11A:
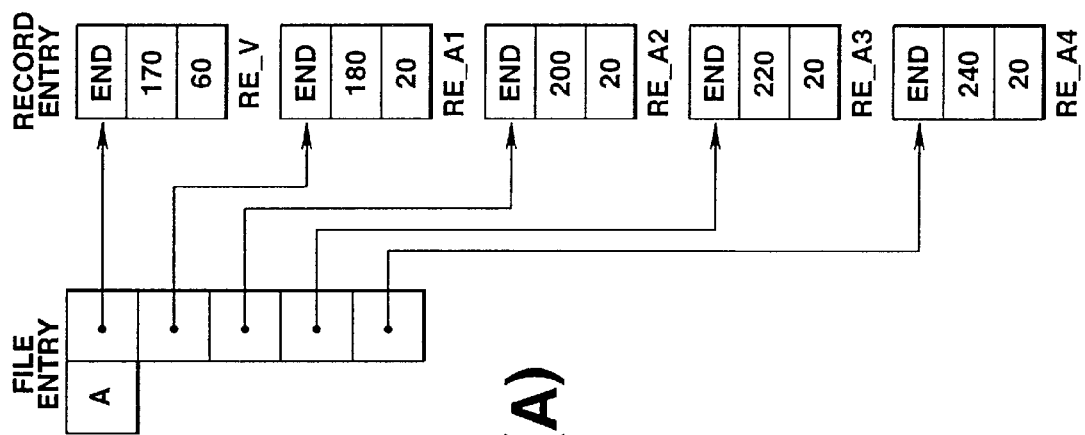

Since a sole speech/video data is sometimes divisionally recorded in plural recording areas, the CPU 41 formulates the file management information of the speech/video data of the files A and B as lists of the linked list form (record entry) shown in FIGS. 11(A) and (B). The CPU 41 generates the vacant recording area data specifying the vacant recording area (free space) of each of the data storage devices 60V, 60A as the list of the linked list form (free space list) as shown in FIG. 11(C). If the link data of ænext record entry linkÆ of the record entry is the end data (END), there exists no next record entry not free space, and the last portion of the speech/video data is recorded in the recording area specified by the record entry. This hold if the link data of ænext free space linkÆ of the free space list is an end value (END).

The operation of the above-described data recording/reproducing apparatus is now explained mainly in connection with the processing for generating the record entry and the playback entry.

First, the operation of recording the video and audio signals entered from outside on the data storage devices 60V and 60A by the data recording/reproducing apparatus 40 is explained by taking an example of recording the video data and the speech data of the file A shown in FIGS. 10A and 10B.

Figure 12:
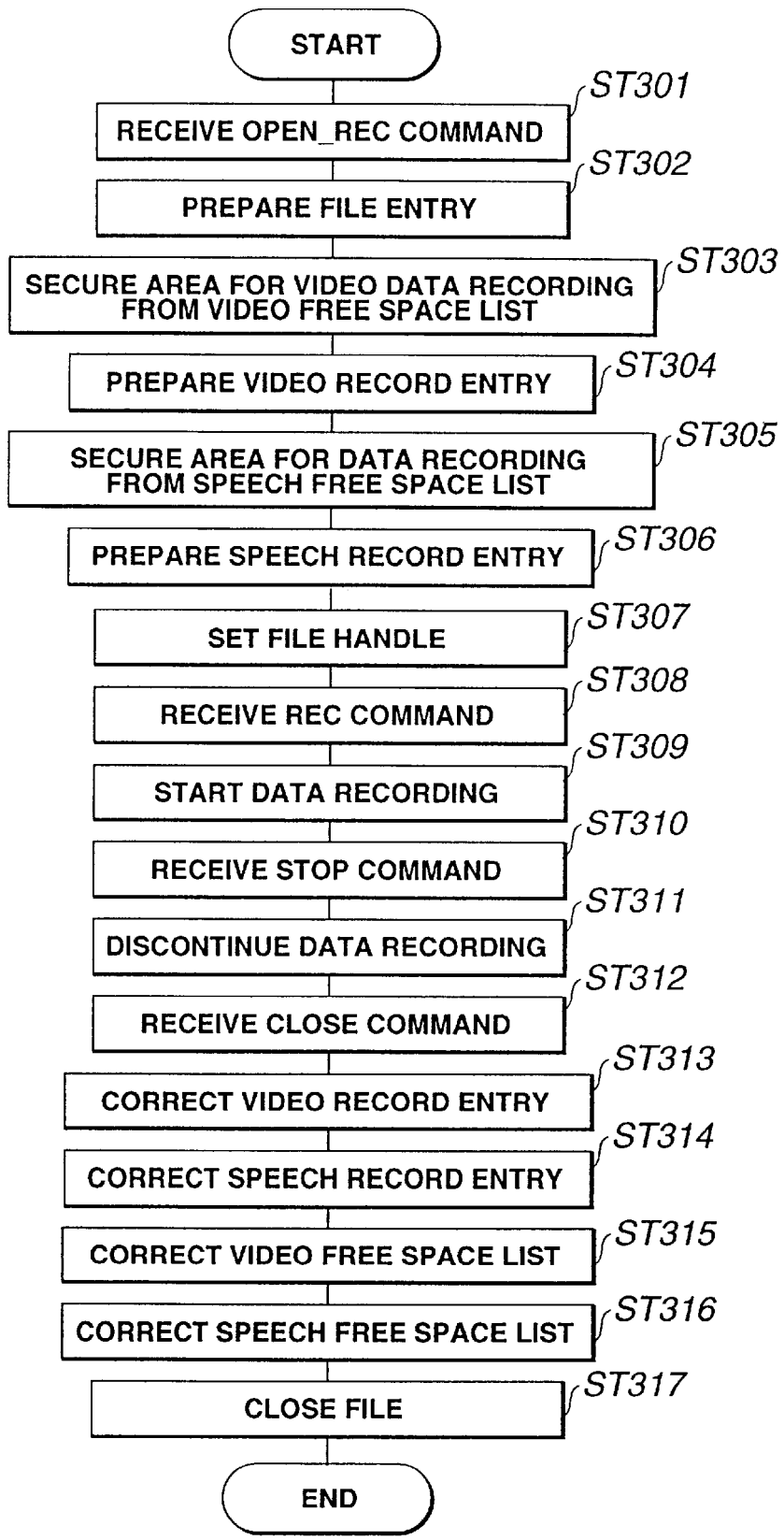
FIG. 12 is a flowchart for illustrating the processing for recording video/speech data entered from outside to the data recording/reproducing apparatus embodying the present invention.
Figure 13:
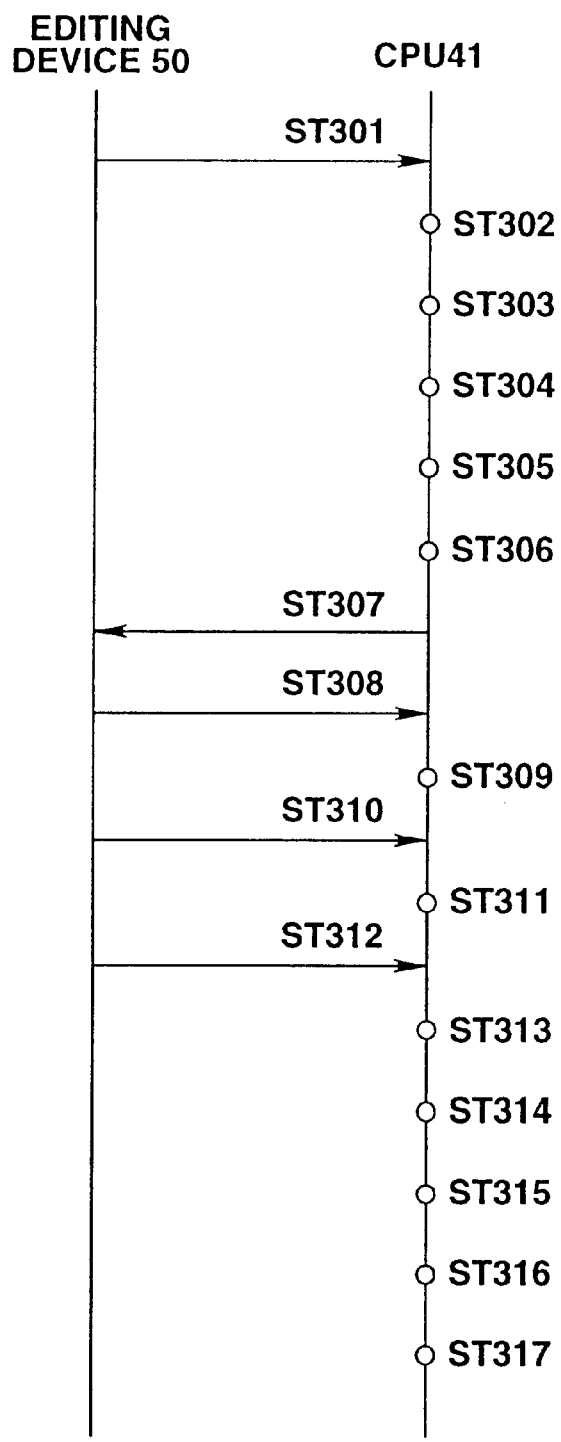
FIG. 13 illustrates the sequence of transmission/reception of control signals between the data recording/reproducing apparatus embodying the present invention and the external editing device when recording video/speech data entered from outside to the data recording/reproducing apparatus embodying the present invention.

FIG. 12 is a flowchart illustrating the processing of the CPU 41 of the data recording/reproducing apparatus 40 for recording the video data entered from outside on the video data storage device 60V and for recording the speech data on the speech data storage device 60A. FIG. 13 is a sequence chart showing control signals between the editing device 50 and the data recording/reproducing apparatus 40 when recording the video and speech data entered from outside on the data storage devices 60V and 60A.

Referring to FIGS. 12 and 13, the editing device 50 outputs to the CPU 41 of the data recording/reproducing apparatus 40 a command (OPEN-REC command) for formulating the record entry of the video and speech data. The record entry includes pre-set data such as file name, such as file A, and data length, which is 60 blocks for video and 20 blocks for each of the four speech channels. The CPU 41 of the data recording/reproducing apparatus 40 receives this OPEN-REC command.

At step ST302, the CPU 41 of the data recording/reproducing apparatus 40 generates the file entry (FIGS. 9A and 11A) for storage in the RAM 43 and in the file management information storage unit 45.

At step ST303, the CPU 41 of the data recording/reproducing apparatus 40 analyzes the free space list stored in the RAM 43 and in the file management information storage unit 45 for securing an area for recording.

At step ST304, the CPU 41 of the data recording/reproducing apparatus 40 generates video record entry (FIGS. 9B and 11A), based on data such as file name included in the OPEN-REC command, for storage in the RAM 43 and in the file management information storage unit 45.

At step ST305, the CPU 41 of the data recording/reproducing apparatus 40 analyzes the free space list for speech stored in the RAM 43 and in the file management information storage unit 45 for securing an area for recording the speech data.

At step ST306, the CPU 41 of the data recording/reproducing apparatus 40 generates speech record entry (FIGS. 9C and 11A), based on data such as file name included in the OPEN-REC command, for storage in the RAM 43 and in the file management information storage unit 45.

At step ST307, the CPU 41 of the data recording/reproducing apparatus 40 sets a file handle (FIG. 9A) for the editing device 50 to have access to the opened file and sends the set file handle to the editing device 50.

At step ST308, the editing device 50 outputs to the data recording/reproducing apparatus 40 a command (REC command) of starting the recording of the video data and the speech data of the file A. The CPU 41 of the data recording/reproducing apparatus 40 receives this REC command.

At step ST309, the CPU 41 of the data recording/reproducing apparatus 40, receiving the REC command, causes the video data entered from the external equipment to be stored in the video data storage device 60V in the sequence in which the video data are stated in the video record entry, while causing the input speech data to be recorded in the speech data storage device 60A in the sequence in which the speech data are stated in the speech record entry.

At step ST310, the editing device 50 outputs to the data recording/reproducing apparatus 40 a command (STOP command) for terminating the recording of the video data and the speech data of the file A. The CPU 41 of the data recording/reproducing apparatus 40 receives this STOP command.

At step ST311, the CPU 41 of the data recording/reproducing apparatus 40, receiving the STOP command, discontinues the recording of the video and speech data of the file A on the data storage devices 60V and 60A.

At step ST312, the editing device 50 outputs to the data recording/reproducing apparatus 40 a command (CLOSE command) of correcting (updating) the record entry and the free space list. The CPU 41 of the data recording/reproducing apparatus 40 receives this CLOSE command.

At step ST313, the editing device 50 records the size of the recorded video data in the recording length data of the video record entry to close the file.

At step ST314, the editing device 50 records the size of the recorded speech data in the recording length data of the speech record entry to close the file.

At step ST315, an area on the recording medium of the video data storage device 60V which has been secured for recording without being used is opened and added to the free space list for video.

At step ST316, an area on the recording medium of the speech data storage device 60A which has been secured for recording without being used is opened and added to the free space list for speech.

At step ST317, the recording file is closed.

Next, the operation of reproducing and outputting the video and speech signals recorded on the data storage devices 60V and 60A by the data recording/reproducing apparatus 40 is explained.

Figure 14:
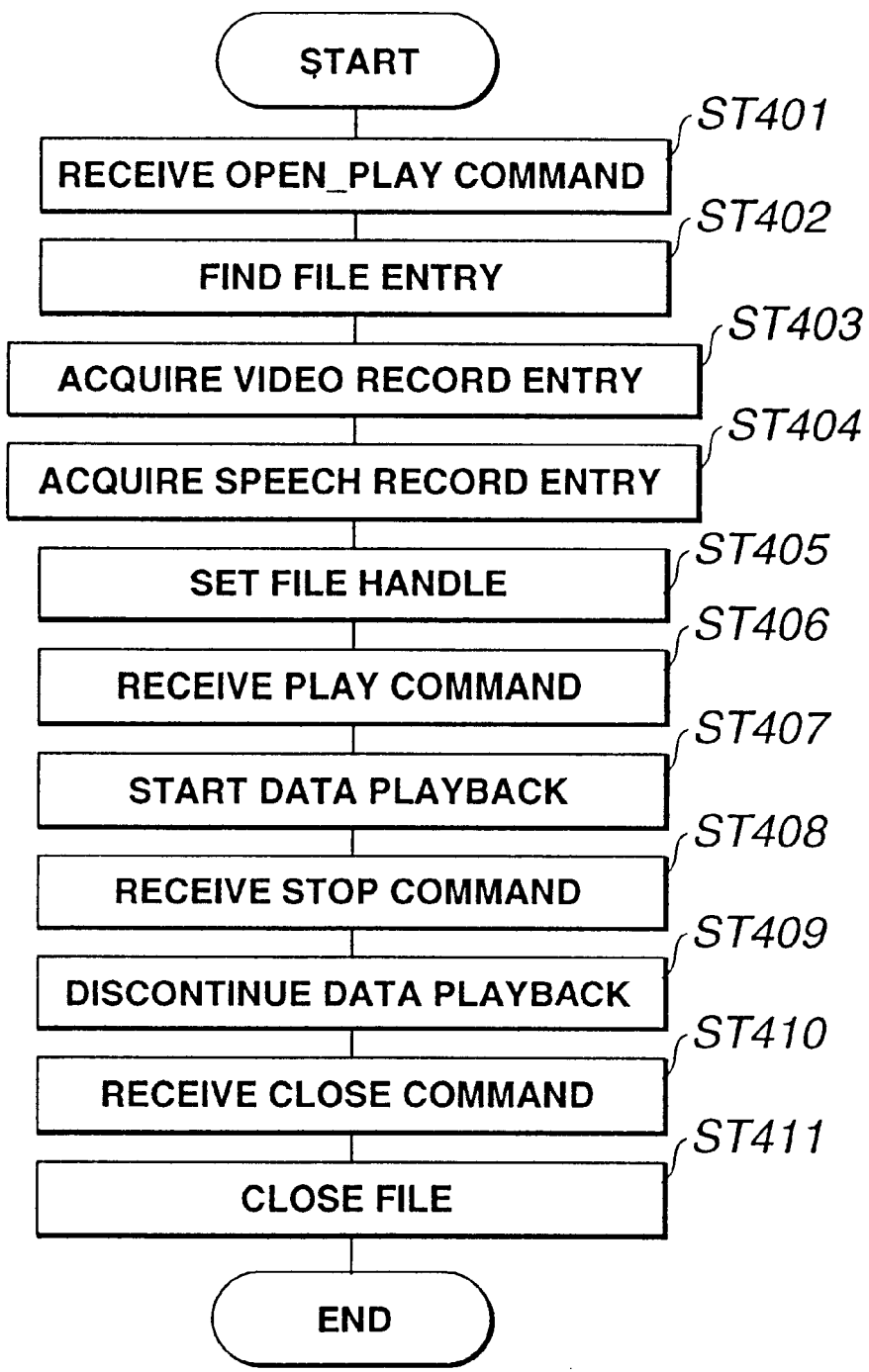
FIG. 14 is a flowchart for illustrating the processing for reproducing video/speech data recorded in the data recording/reproducing apparatus embodying the present invention.
Figure 15:
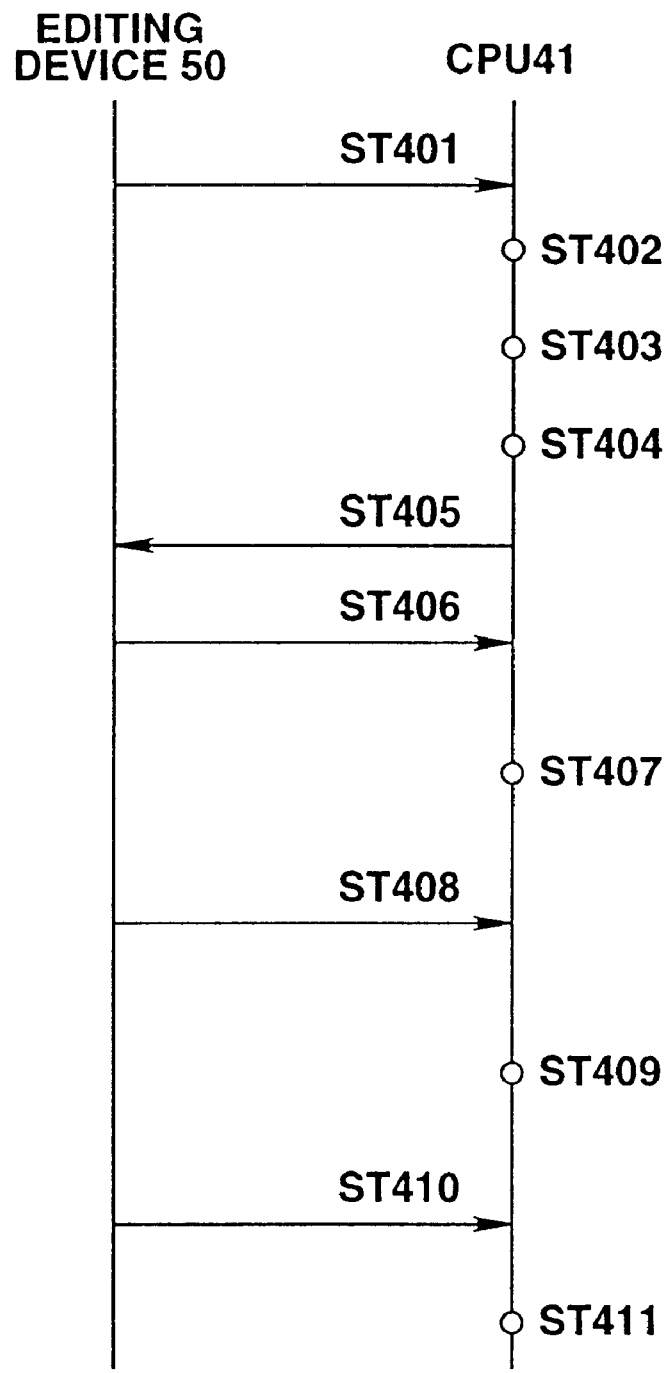
FIG. 15 illustrates the sequence of transmission/reception of control signals between the data recording/reproducing apparatus embodying the present invention and the external editing device when reproducing video/speech data.

FIG. 14 is a flowchart for illustrating the processing for reproducing the speech/video data by the CPU 41 of the data recording/reproducing apparatus 40 shown in FIG. 8. FIG. 15 is a sequence chart of control signals between the editing device 50 and the CPU 41 of the data recording/reproducing apparatus 40 when reproducing the speech/video data recorded on the data storage devices 60V and 60A by the data recording/reproducing apparatus 40.

In FIGS. 14 and 15, the editing device 50 outputs, at the first step ST401, a command (OPEN-PLAY command) to the data recording/reproducing apparatus 40 for making ready for reproduction of video and speech data including the data of the file name, such as file A. The CPU 41 of the data recording/reproducing apparatus 40 receives this OPEN-PLAY command.

At step ST402, the CPU 41 of the data recording/reproducing apparatus 40 retrieves the file name of the optional data of the OPEN-PLAY command from the file name items of the file entry stored in the RAM 43 and in the file management information storage unit 45 and, based on the retrieved result, acquires the record entry of the video data and the speech data of the file A (record entry number).

At step ST403, the contents of the video record entry of the video data of the retrieved file entry are sequentially acquired from the items of the initial video record entry as specified by the record entry number acquired at step ST402.

At step ST404, the contents of the speech record entry of the speech data of the retrieved file entry are sequentially acquired from the items of the initial speech record entry as specified by the record entry number acquired at step ST402.

At step ST405, the data recording/reproducing apparatus 40 sets a file handle for the editing device 50 to access the opened file and routes the set file handle to the editing device 50.

At step ST406, the editing device 50 outputs to the data recording/reproducing apparatus 40 a command (PLAY command) of starting the reproduction of the speech/video data A. The CPU 41 of the data recording/reproducing apparatus 40 receives this PLAY command.

At step ST407, the CPU 41 of the data recording/reproducing apparatus 40 takes out the video data and the speech data of the file A recorded in the data storage device 30, from the area stated in the record entry. The CPU then sequentially reproduces and outputs the video and speech data to the editing device 50.

At step ST408, the editing device 50 outputs to the data recording/reproducing apparatus 40 a command (STOP command) for discontinuing the reproduction of the speech/video data A. The data recording/reproducing apparatus 40 receives this STOP command.

At step ST409, the data recording/reproducing apparatus 40 controls the data storage devices 60V and 60A to discontinue reproduction of the video and speech data.

At step ST410, the editing device 50 outputs a command (CLOSE command) of closing the playback file to the data recording/reproducing apparatus 40. The data recording/reproducing apparatus 40 receives this CLOSE command.

At step ST411, the editing device 50 closes the file A of the video and speech data which was being reproduced.

In the data recording/reproducing apparatus for video/speech data, described above with reference to FIGS. 8 to 15, since the video data and the speech data are recorded in separate data storage devices 60V and 60A, respectively, and are managed using the file management information for video and the file management information for speech, respectively, the number of channels of the speech data can be modified at any time, so that it is possible for the speech data with different number of channels to co-exist and hence data composed only of the speech or only of vide can be handled while only the video or only optional audio channels can be changed at will.

Its to be noted that the present invention is not limited to the above-described embodiments. For example, the number of channels of the speech signals is not limited to four and may be 1, 2, 3 or 5, if so desired.

What is claimed is:

1. A data recording and/or reproducing apparatus comprising:

data recording and/or reproducing means for processing and recording a data file including video data on hard-disk and for reproducing said recorded data file; and data management means for managing said recorded data file on said hard-disk by a file entry and one or more record entries, said file entry having a file name of said recorded data file and a link information of a record entry, each of said one or more record entries having a record entry number, leading position data indicating a leading position of an area in which said recorded data file is continuously recorded on said hard-disk, and recording length data indicating a length of the area in which said recorded data file is continuously recorded on said hard disk, said link information being used to specify the record entry number associated with the initial record entry of said recorded data file;

said record entry specifies the record entry number corresponding to the data in said recorded data file to be reproduced next; and said recording and/or reproducing means has access to said hard-disk and reproduces said recorded data file on the basis of said file entry and said one or more record entries.

2. The data recording and/or reproducing apparatus according to claim 1, wherein said record entry of said data management means is constructed by every continuously recorded area on said hard-disk.

3. The data recording and/or reproducing apparatus according to claim 2, wherein said record entry having further a link information of next record entry if said data file is recorded on said hard-disk discretely.

4. A data recording/reproducing apparatus comprising:

first data recording/reproducing means for processing and recording a video data file on a video random-accessible recording medium as one or more records each of which is a set of data continuous on the video recording medium and for reproducing the recorded video data file;

second data recording/reproducing means for processing and recording a speech data file on a speech random-accessible recording medium as one or more records each of which is a set of data continuous on the speech recording medium and for reproducing the recorded speech data file;

data management means for managing the video data file and the speech data file, each recorded as one or more records on the recording medium, by a file entry, a video data record entry and a speech data record entry, the file entry having a file name of the video data file, a file name of the speech data file, a record entry number of a leading record of the video data file and a record entry number of a leading record of the speech data file, the video data record entry being provided in association with each record of the video data file and having a video record entry number of the next video record presenting data continuity with respect to the current video record, leading position data specifying the leading end of a recording area of the current video record, and recording length data specifying the size of the recording area of the current video record, the speech data record entry being provided in association with each record of the speech data file and having a speech record entry number of the next speech record presenting data continuity with respect to the current speech record, leading position data specifying the leading end of a recording area of the current speech record, and recording length data specifying the size of the recording area of the current speech record.

* * * * *